United States Patent Office 3,188,545
Patented June 8, 1965

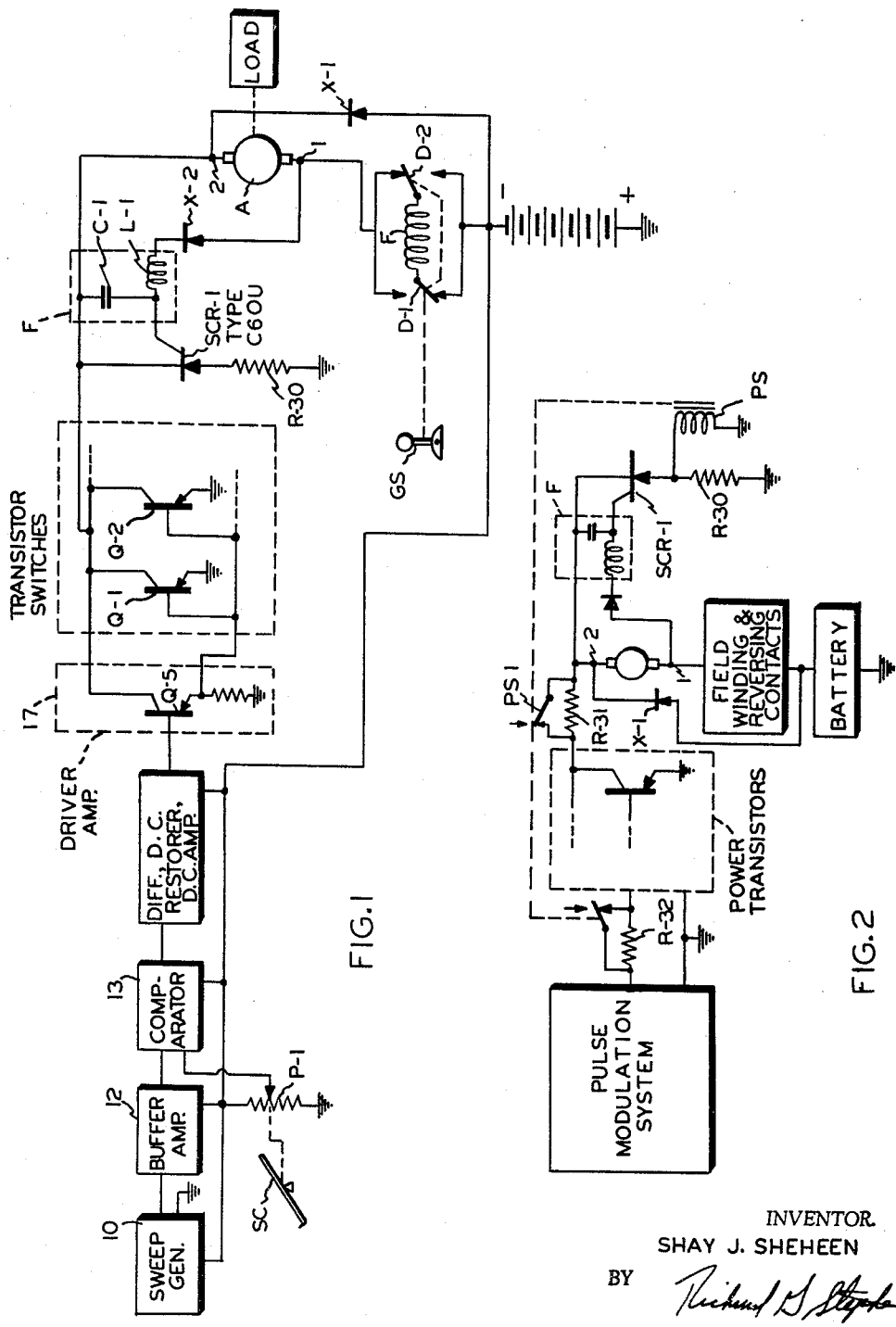

3,188,545
MOTOR CONTROL SYSTEMS
Shay J. Sheheen, Freeville, N.Y., assignor to The Raymond Corporation, Greene, N.Y., a corporation of New York
Filed Dec. 21, 1962, Ser. No. 246,588
9 Claims. (Cl. 318—261)

This invention relates to motor control systems, and more particularly, to an improved solid state, substantially step-less electronic control system for a reversible direct current motor, such as, for example, the direct current series-wound or compound-wound motors commonly used with battery-operated materials handing machinery such as lift trucks, hoists, cranes and like devices. This invention is in some respects an improvement over the motor control system shown in my prior copending application Serial No. 218,211, filed August 15, 1962, although the invention shown herein is applicable as well to various other motor control systems of the same general nature.

In very many motor control systems, and particularly in series motor traction applications, it frequently is considered necessary or desirable to be able to "plug" motors in order to minimize the time required to reverse the direction of the device driven by the motor. "Plugging" a motor involves connecting it to run in a direction opposite to that in which it is running at the time, and because the counter-electromotive force voltage developed across the armature of a plugged motor tends to increase current flow through the motor, rather than to decrease current flow as it does under normal conditions, the currents flowing through the motor during plugging are sometimes extreme. In the power transistor motor control system of my above-mentioned copending application, and in numerous other solid-state motor control systems, the number of power transistors or like current-controlling devices which must be parallel in order to handle maximum motor current depend obviously on whether such current-controlling devices must carry the extreme currents which occur during plugging. In order to avoid the need for handling plugging level currents, and hence to use a fewer number of power transistors, the system shown in my prior application utilizes an electromechanical switch-relay arrangement to short out and by-pass the power transistors during plugging operations. A first double-throw switch is driven by the motor output shaft through a slip clutch against the force of a centering spring, so that the switch position indicates instantaneous direction of motor rotation. A second double-throw switch is operated by the machine operator in accordance with desired motor direction. The two switches are connected to plugging relay, which is operated to short across the power transistor collector-emitter circuits and thereby protect the power transistors during the plugging which results if the operator moves his control so as to make desired direction opposite from instantaneous direction. While such an arrangement is frequently satisfactory and adequately effective to prevent semi-conductor burn-out due to plugging, it is undesirably complex, requiring a slip-type operated switch and a relay. Since the relay must be capable of handling high currents, it must include heavy contacts. Such a relay must operate quite rapidly in order to protect the transistors, and consequently, the plugging relay may be expensive. Furthermore, since slip-type switches usually are friction-operated, they require frequent adjustment. If mis-adjustment or wear of the friction-operated switch results in late closing of the plugging relay, power transistors sometimes are accidentally destroyed. In the present invention the mechanically-operated switch is completely eliminated, and replaced by an electronic circuit which is automatically and practically instantaneously operative to cause plugging level currents to by-pass the power transistors, without requiring any auxiliary switches or relays.

In the specifically disclosed embodiments of the present invention, the power transistors are connected in parallel with a controlled rectifier, which is gated "on" upon occurrence of plugging and operative to shunt plugging level currents past the power transistors. The controlled rectifier is gated on automatically in accordance with the counter E.M.F. of the motor, and hence it operates without the need for any mechanically-operated switch.

Thus, it is a primary object of the present invention to provide an improved motor control system which will accommodate plugging level currents without damaging the motor control current-controlling elements.

It is a further object of the invention to provide an improved motor control system of the above-mentioned type which operates automatically and substantially instantaneously, and which does not require critical or frequent adjustment.

It is yet another object of the invention to provide a motor control system of the character described which is simple, economical and reliable, and which includes a minimum number of moving parts.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 is an electrical schematic diagram partially in block form of one exemplary embodiment of the invention;

FIG. 2 is an electrical schematic diagram of one alternative form of the invention;

Figure 3:
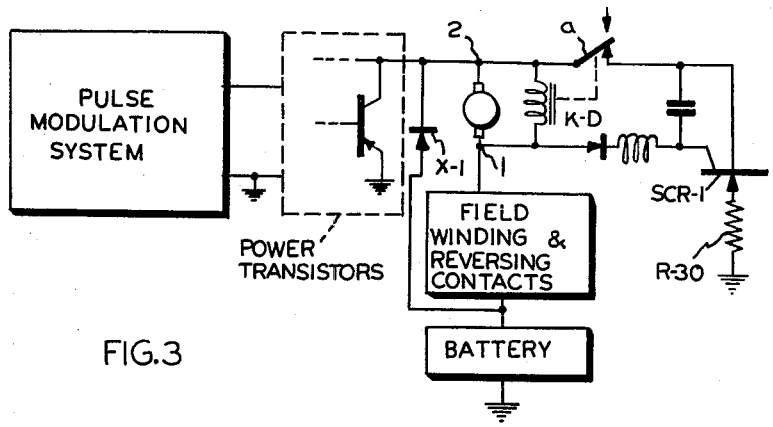
FIG. 3 is an electrical schematic diagram illustrating a further embodiment of the invention.

The invention is illustrated in FIG. 1 as including a sweep generator 10 which provides a recurrent sawtooth voltage at a constant frequency, a buffer amplifier 12 which connects the sawtooth voltage to a comparator 13, and a control means P–1, which applies a further signal voltage to comparator 13. Control means P–1 in an ordinary manually controlled traction application may comprise a conventional potentiometer, the wiper arm of which is adjusted by the operator by means of foot treadle SC to determine motor speed. The output voltage from comparator 13 is differentiated, D.C.-restored, amplified and applied to driver amplifier 17, the output of which drives a plurality of paralleled power transistors Q–1, Q–2, etc., each of which has its collector-emitter circuit connected in series with the field F and armature A of D.C. series motor M. The above-described circuit, which is shown and described in detail in my mentioned prior application comprises a pulse width modulation system which applies current pulses to the motor, the duty cycle of each pulse being controlled by the output of comparator 13, so that adjustment of potentiometer P–1 to provide a greater speed results in pulses of greater time width (i.e., a greater percentage of the duty cycle) being applied to the motor. As explained in my prior application, driver transistor Q–5 is returned to power through the motor rather than being connected through a separate load resistance, to obtain particular benefits. While the instant invention is illustrated in connection with the pulse width modulation system of my present invention, it will be apparent to those skilled in the art that the present invention is applicable as well to pulse frequency modulation systems and various other current modulating systems.

The speed of the motor is determined by the position of operator control SC, which determines the setting of the wiper arm of potentiometer P-1. The direction of rotation of the motor is determined by the position of operator control GS, which mechanically serves to adjust reversing switches D-1 and D-2. If controls GS and switches D-1 and D-2 are adjusted to the position shown in FIG. 1, current will flow from right-to-left through field F, and conversely, if D-1 and D-2 are both swung to their opposite positions, current will flow from left-to-right through field F, and motor rotation will be in the opposite direction. It should be noted that during either direction of rotation, current normally will flow downwardly through armature A as viewed in FIG. 1. During normal "unplugged" operation, armature terminal 1 will be negative with respect to armature terminal 2. When the motor is accelerated from zero speed, armature terminal 1 will be quite negative with respect to terminal 2, due to the heavy starting current causing a large voltage drop across armature A, and as the motor speeds up, the counter E.M.F. voltage of opposite polarity will decrease the net voltage drop across armature A, so that at ordinary running speeds armature terminal 1 will be less negative, but at least still slightly negative with respect to terminal 2.

Connected in parallel with power transistors Q-1 and Q-2 is silicon controlled rectifier SCR-1 poled as shown, with the SCR-1 cathode connected to the PNP power transistor collectors, and with the SCR-1 anode connected (through resistance R-30) to the power transistor emitters. The SCR gate lead is connected through a filter F and diode X-2 as shown to the opposite side of the motor armature A, so that the counter E.M.F. developed across the motor armature is applied between the cathode and gate lead of the SCR. In order to "fire" and conduct, the SCR-1 anode must be positive with respect to the cathode and the gate lead must be positive with respect to the cathode. During normal acceleration the SCR anode is positive with respect to the cathode but terminal 1 is negative with respect to terminal 2, so that the SCR does not conduct. With the vehicle moving in one direction, if the operator wishes to plug the motor and moves reversing switch GS to call for reverse motor operation, it will be seen that reversing the field winding causes the polarity of the counter E.M.F. voltage across the armature to reverse, thereby providing the proper polarity voltage on the gate lead to fire the SCR. When the SCR fires, current flows through the SCR anode-cathode circuit and resistor R-30, which is in parallel with the power transistor collector-emitter circuits, thereby diverting through SCR-1 and resistor R-30 much of the current which otherwise would pass through the power transistors. Since the paralleled power transistors need not carry all of the extreme plugging level current, a lesser number of transistors need be paralleled for a given application. In very many motor applications such as lift truck drive motor applications, for example, motor load inertias are such that plugging level currents do not last very long, and hence the controlled rectifier may be used to handle surge currents greatly in excess of its continuous current rating. In a typical example in which a 24 volt 3 horsepower motor having ordinary accelerating currents of 200 amperes, and plugging level currents of 500 amperes, the nominal 60 ampere controlled rectifier (Type C60U) was connected to absorb plugging current surges of several hundred amperes. It will be apparent that for certain high current applications it may be desirable to connect two or more controlled-rectifiers in parallel with the power transistors, with the motor counter E.M.F. voltage connected to control each of their gate leads. If the series resistors (such as R-30) in circuit with the different controlled rectifiers are made different, the controlled rectifiers can be made to extinguish at different motor current values. The purpose of diode X-2 and filter F in the gate lead circuit is to prevent the SCR from firing during normal (unplugged) operation due to "noise" caused by commutation of the motor current. The back resistance of diode X-2 effectively disconnects filter F and the gate lead from armature terminal 1 whenever terminal 1 is negative. If positive spikes having greater amplitude than the C.E.M.F. voltage result from commutation and appear at terminal 1 during unplugged operation, low-pass filter F smooths or integrates them, providing a direct voltage component on the gate lead which is much smaller than the counter E.M.F. voltage, so that the SCR gate lead does not become positive and the SCR does not fire. During a plugging operation, however, the low forward resistance of diode X-2 connects the armature terminal 1 voltage to filter F and the SCR gate lead, and the gate lead is driven very positive. It will be seen that if the time constant of filter F is made extremely long, the positive rise of the gate lead upon occurrence of plugging will be delayed, undesirably delaying the firing of the SCR. The spikes caused by motor current commutation are quite narrow in usual motor applications, however, so that a low-pass filter having a modest time constant will serve adequately to smooth the gate lead voltage without seriously delaying the firing of the SCR. In a typical application of the invention wherein SCR-1 was a General Electric Type C60U controlled rectifier, and in which a 24 volt battery was used to drive a 3 H.P. series motor, a suitable low-pass filter employed a 10 millihenry choke and a 50 microfarad capacitor, and the diode X-2 forward resistance was of the order of 30 ohms.

The lower the resistance of the SCR in its conducting state and the lower the resistance of R-30, each compared to the effective resistance of the power transistors, the more current will be diverted from the power transistors. The effective resistance of the power transistors during plugging will be seen to depend, of course, upon how they are driven during plugging, and hence upon the position of speed control treadle SC. Thus if SC is advanced to its high speed position during plugging, SCR-1 will divert a lesser percentage of motor current than if speed control SC is in a low speed position.

When an SCR once conducts, its gate lead loses control, and the SCR continues to conduct even if the gate lead signal is removed or reversed, until either the SCR anode-cathode voltage is lowered to a low value or the SCR current is reduced to a low level. Thus, once plugging is initiated, SCR-1 remains conducting as the level of plugging current falls, as the vehicle slows down in its initial direction preparatory to reversing.

When the motor reaches zero speed the counter E.M.F. voltage is zero and after reversal the counter E.M.F. again has its original polarity, with armature terminal 1 negative with respect to terminal 2. However, since the gate lead no longer controls the SCR, the SCR may continue to divert current around the power transistors. However, if the operator momentarily moves reversing switch GS to "neutral" before beginning acceleration in the reverse direction, the current through the SCR will be momentarily interrupted and the SCR will be cut off. Then, normal acceleration in the reverse direction may be done. It is not necessary, however, that the operator momentarily center reversing control GS. If, instead, he operates speed control SC toward a high speed position, the average resistance of the power transistors will be decreased, so that more of the motor current will flow through the power transistors and less through the SCR and as motor current decreases from a plugging level to a starting level, the fraction of total motor current flowing through the SCR may be made less than the required maintaining current of the SCR, so that the SCR will be extinguished.

In many applications of the invention the impedance of controlled rectifier SCR–1 and resistance R–30 may be adjusted with respect to the power transistors so that it becomes unnecessary either to move the reversing switch to neutral or to manipulate the speed control in order to shut off the SCR. Resistance R–30 may be selected so that the current through the SCR when starting current is flowing through the motor does not appreciably exceed the maintaining current necessary to keep the SCR conducting. Then as plugging current decreases below the starting current level, the SCR will be automatically extinguished. The higher the value of resistance R–30, the sooner the SCR will extinguish, but the less current will be diverted during plugging from the power transistors to the SCR, and hence the less the power transistors will be relieved of carrying high currents.

In the alternative embodiment of FIG. 2 the power transistors are protected largely independently of the value of resistance R–30 by the insertion of a series resistance R–31 in circuit with the power transistors. In this arrangement the voltage developed across resistor R–30 when SCR–1 fires is used to excite the coil PS of plugging relay PS–1, which is connected to open a pair of normally-closed contacts which normally short out resistor R–31, thereby inserting resistor R–31 in between the motor and the power transistors, thereby further decreasing the current through the power transistors and increasing the current through SCR–1 and resistor R–30, so that any desired proportion of the motor current may be routed through the SCR rather than the transistors. In such an arrangement it will be apparent that plugging level current is avoided by two separate means which operate at different times, since plugging relay PS–1 does not become energized to insert resistance R–31 until after the SCR fires. Thus, the SCR serves to absorb the peak of the current surge which results from plugging, and shortly thereafter relay PS–1 operates to further reduce plugging currents to any desired level. When the motor current falls from plugging level to ordinary starting current level, relay PS–1 will drop out, thereby increasing the proportion of motor current which flows through the power transistors and decreasing the current through SCR–1, so that SCR–1 is extinguished automatically. As shown in FIG. 2, plugging relay PS–1 also may be provided with a further pair of contacts which normally short out resistance R–32 in the power transistor driving circuit and which open upon the occurrence of plugging to reduce the power transistor drive, thereby further reducing power transistor current as soon as relay PS–1 operates.

In the further embodiment shown in FIG. 3, the coil of relay K–D is connected directly across the motor armature and contact $a$ of relay K–D is connected in series with the anode-cathode circuit of SCR–1. At any time during which the motor has substantial speed, relay K–D will be energized closing its contact $a$. After plugging occurs and SCR–1 fires, the counter E.M.F. voltage across the motor will fall as the motor slows down preparatory to reversing, and at a low speed relay K–D will drop out, interrupting the current through SCR–1 and automatically resuming normal operation without the necessity of the operator temporarily placing his direction control GS in neutral position or of manipulating speed control SC.

Figure 4:
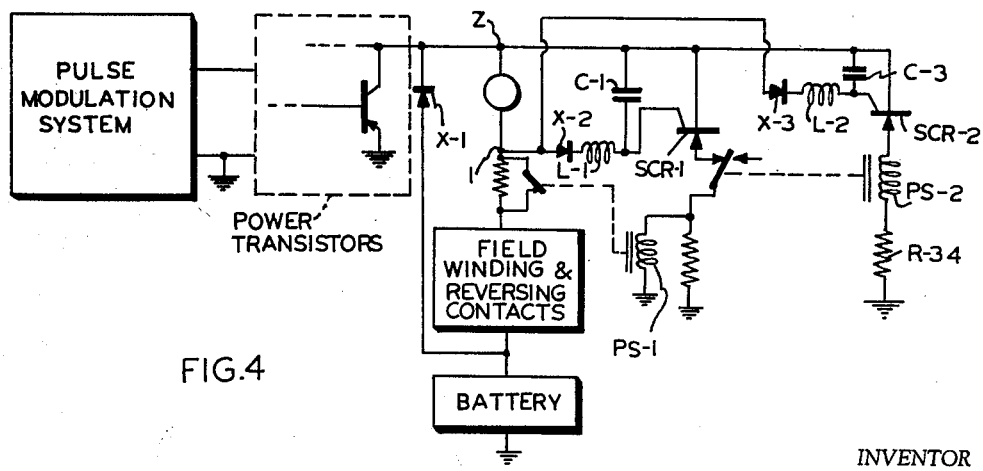
FIG. 4 is an electrical schematic diagram illustrating yet another embodiment of the invention.

In the further embodiment illustrated in FIG. 4, a second controlled rectifier SCR–2 is provided to turn off SCR–1 near the end of a plugging operation. In ordinary applications SCR–1 will comprise a heavy current controlled rectifier, e.g., 60 amperes, while SCR–2 will comprise a much smaller unit, e.g., 5 amperes.

The SCR–1 circuit of FIG. 4 will be seen to be identical to that of FIG. 2. The gate lead-cathode circuit of SCR–2 is connected opposite to that of SCR–1, so that the SCR–2 gate lead is positive with respect to the SCR–2 cathode during normal (unplugged) operation, and hence SCR–2 will be conducting during normal operation. Resistance R–34 and the resistance of the coil of relay PS–2 are chosen so that only the small current necessary to maintain SCR–2 conducting flows through SCR–2, in the interests of economy, so as to minimize drain on the battery supply. With SCR–2 conducting, relay PS–2 will be energized, opening its contact $a$ in series with SCR–1, so that SCR–1 cannot conduct. When the direction switch is operated to commence plugging, the interruption of motor current immediately cuts off SCR–2 and contact $a$ of relay PS–2 closes, so that SCR–1 fires and diverts current from the power transistors in the same manner as heretofore explained. Since plugging results in reversal of the counter E.M.F. voltage, the SCR–2 gate lead will be negative as plugging continues and SCR–2 will remain cutoff. However, near the end of a plugging operation, when the motor is at a very low speed, so that the counter E.M.F. becomes less than the armature IR drop, the SCR–2 gate lead will be seen to become positive, so that the SCR–2 will fire, energizing relay PS–2 and cutting off SCR–1, so that normal acceleration may then occur with SCR–1 automatically extinguished. The arrangement of FIG. 4 is advantageous in that cutoff of SCR–1 does not depend upon any circuit adjustments crucially dependent upon the characteristics of the controlled rectifiers, and hence replacement of the rectifiers may be done in the field using controlled rectifiers whose characteristics frequently differ.

As is well known to those skilled in the art, the peak level and duration of the maximum motor current which occurs during the plugging of a given motor depends not only upon how hard the motor is plugged but also upon the inertia of the motor load. If the motor load has great inertia, extremely high plugging currents last longer than if the load has low inertia. In the design of a given embodiment of the invention which utilizes relays as well as the SCR to protect the power transistors, in designing for given load inertia conditions the SCR–1 circuit, since it acts to divert current much faster than an electro-mechanical relay, should be designed to divert sufficient current from the power transistors to adequately protect them long enough for a relay such as PS–1 to close, to insert a resistance into the motor circuit and/or the pulse modulation driving circuit.

While the invention has been illustrated in connection with a current controlling system using power transistors, it will be apparent to those skilled in the art that it may be used to advantage in motor control systems using other current modulating or switching devices, particularly those of a semiconductor nature. It will further be apparent that while the invention has been illustrated in connection with a simple series motor, that the invention is applicable as well to shunt motors and to compound-wound motors, all of which may be plugged by reversing the relative polarity between an armature and a field winding, and to split-field motors, which may be reversed by switching from one field winding to a second oppositely-poled field winding. It also will be evident that the invention is applicable to automatically reversed motor systems, including a variety of servomechanism systems, as well as to the manually reversed systems shown in the specifically disclosed embodiments of the invention. In any of the disclosed embodiments it will be evident that motor reversal may be effected by reversing armature connections instead of field winding connections, and since the reversal of either will reverse the counterelectromotive force voltage of the motor, a control signal for suitably firing the SCR will be available in either arrangement.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A direct current motor control system, comprising, in combination: a direct voltage source; a motor comprising an armature circuit and a field winding circuit; a current modulating circuit, said source, at least one circuit of said motor and said current modulating circuit being connected in a closed series circuit; means for reversing the relative polarity connection between said armature circuit and said field winding circuit of said motor to reverse the direction of operation of said motor; a controlled rectifier having an anode-cathode circuit and a control terminal; first circuit means connecting said anode-cathode circuit in parallel with said current modulating circuit; and second circuit means for applying the voltage across said armature circuit to said control terminal.

2. Apparatus according to claim 1 in which said current modulating circuit includes a transistor and means for driving said transistor between saturation and cutoff current conditions to control the average current in said series circuit.

3. Apparatus according to claim 1 in which said first circuit means includes a first resistance connected in series with said anode-cathode circuit.

4. Apparatus according to claim 1 in which said first circuit means includes switching means responsive to the voltage across said armature for interrupting said anode-cathode circuit when said voltage across said armature decreases below a predetermined value.

5. Apparatus according to claim 1 having switching means connected in series with said anode-cathode circuit; a second controlled rectifier having a second anode-cathode circuit and a second control terminal; third circuit means connecting said second anode-cathode circuit in parallel with said current-modulating circuit and said armature; fourth circuit means connecting the voltage across said armature between the cathode of said second controlled rectifier and said second control terminal; and means responsive to the current through said second anode-cathode circuit for controlling said switching means.

6. Apparatus according to claim 1 in which said second circuit means includes filter means to smooth the voltage applied to said control terminal.

7. Apparatus according to claim 3 having switching means responsive to the voltage across said first resistance and operative to insert a second resistance into said closed series circuit.

8. Apparatus according to claim 3 having switching means responsive to the voltage across said first resistance and operative to vary the impedance of said current modulating circuit.

9. A control system for a reversible direct current motor, comprising, in combination: a direct voltage source; a motor comprising an armature circuit and a field winding circuit; a current modulating circuit, said source, at least one circuit of said motor and said current modulating circuit being connected in a series circuit; means for reversing the relative polarity connection between said armature circuit and said field winding circuit of said motor to reverse the direction of said motor; a controlled rectifier having anode, cathode and control terminals; first circuit means connecting said anode and cathode in shunt circuit relationship with said current modulating circuit; and second circuit means including low-pass filter means for applying the voltage across said armature circuit between said cathode and said control terminal of said controlled rectifier to cause said controlled rectifier to conduct when operation of said reversing means to plug said motor causes the polarity of said voltage across said armature circuit to reverse.

References Cited by the Examiner

UNITED STATES PATENTS

| 2,885,621 | 5/59 | Brown | 318—373 |
| 3,064,175 | 11/62 | Vergez | 318—345 |
| 3,098,949 | 7/63 | Goldberg | 317—31 X |

OTHER REFERENCES

IBM Technical Disclosure Bulletin, vol. 2, No. 4, December 1959, page 96.

ORIS L. RADER, *Primary Examiner.*